No. 867,184. PATENTED SEPT. 24, 1907.
J. H. BAKER.
BRAKE BEAM.
APPLICATION FILED JAN. 9, 1907.

4 SHEETS—SHEET 1.

WITNESSES:
J. Herbert Bradley
Charles B. Smith

INVENTOR
James H. Baker
by Christy and Christy
Att'ys

No. 867,184. PATENTED SEPT. 24, 1907.
J. H. BAKER.
BRAKE BEAM.
APPLICATION FILED JAN. 9, 1907.

4 SHEETS—SHEET 2.

WITNESSES:
J. Herbert Bradley.
Charles Barnett.

INVENTOR
James H. Baker
by Christy and Christy
Att'ys

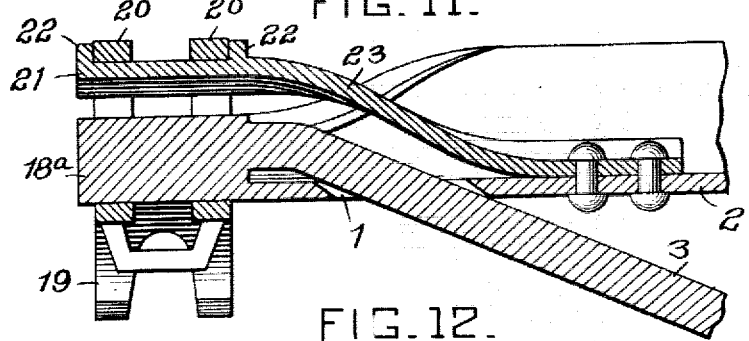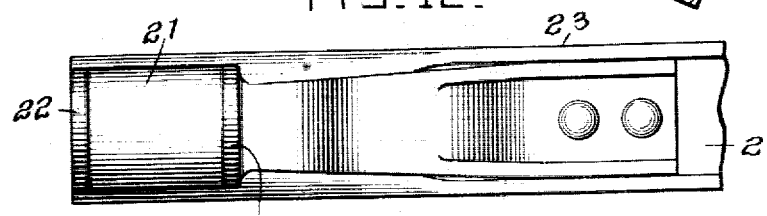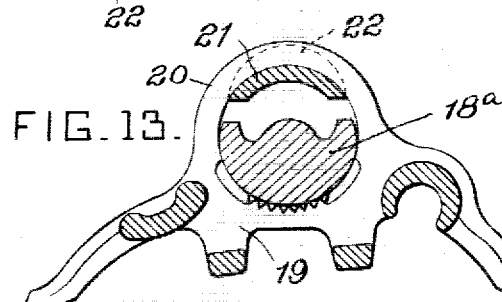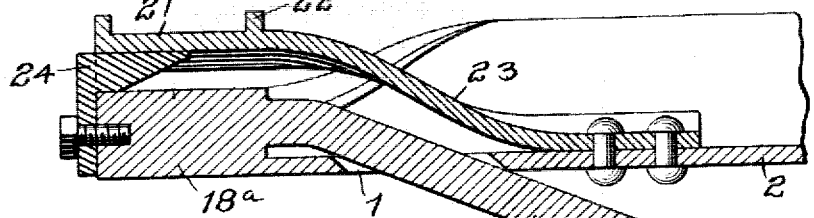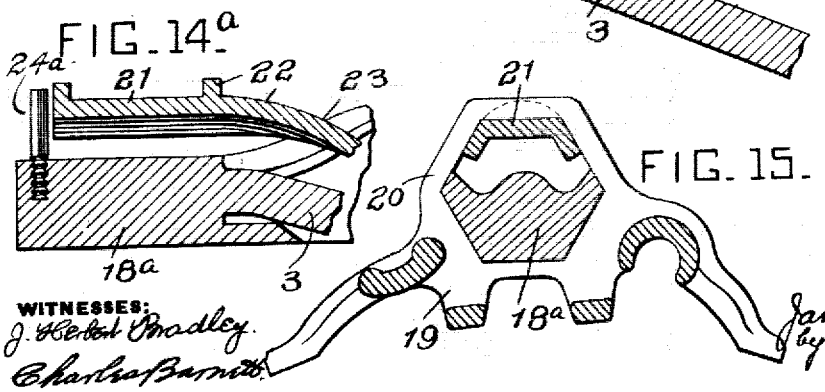

No. 867,184. PATENTED SEPT. 24, 1907.
J. H. BAKER.
BRAKE BEAM.
APPLICATION FILED JAN. 9, 1907.
4 SHEETS—SHEET 4.
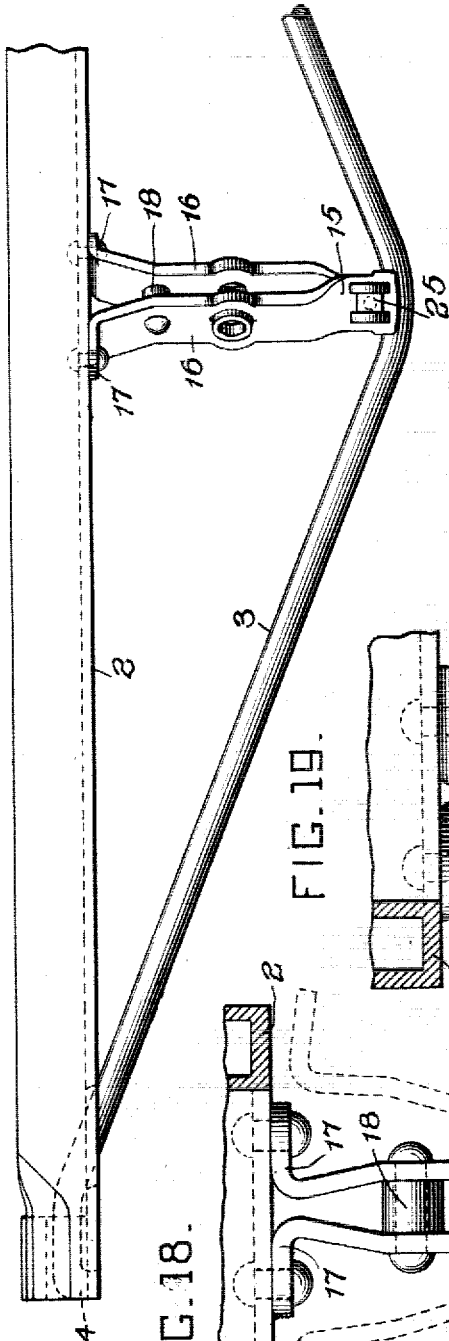
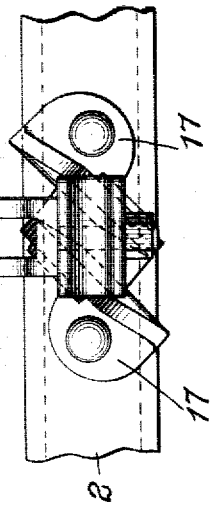
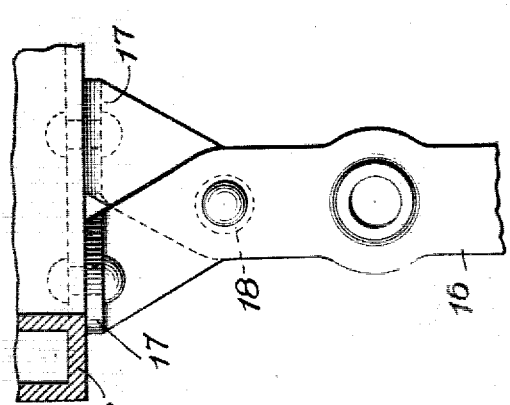
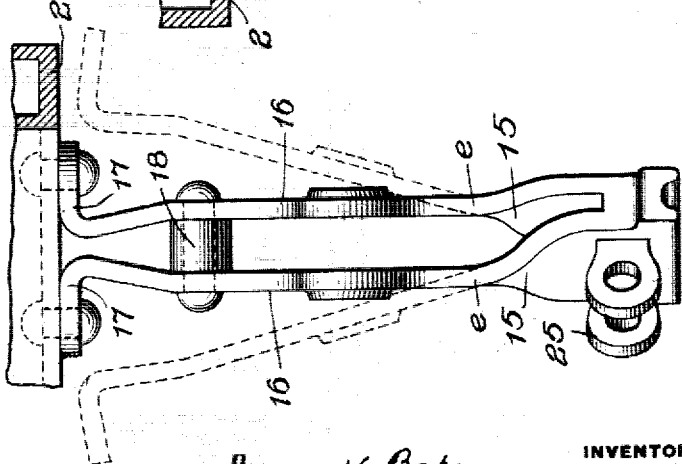
WITNESSES: INVENTOR
James H. Baker
by Christy and Christy
Att'y's

UNITED STATES PATENT OFFICE.

JAMES H. BAKER, OF ALLEGHENY, PENNSYLVANIA, ASSIGNOR TO SOLID STEEL TOOL & FORGE COMPANY, OF BRACKENRIDGE, PENNSYLVANIA, A CORPORATION OF PENNSYLVANIA.

BRAKE-BEAM.

No. 867,184.　　　　　Specification of Letters Patent.　　　Patented Sept. 24, 1907.

Application filed January 9, 1907. Serial No. 351,501.

*To all whom it may concern:*

Be it known that I, JAMES H. BAKER, residing at 1240 Palo Alto street, Allegheny, in the county of Allegheny and State of Pennsylvania, a citizen of the United States, have invented or discovered certain new and useful Improvements in Brake-Beams, of which improvements the following is a specification.

The invention described herein relates to certain improvements in brake beams for railway cars, and has for its object the construction of a brake beam having the ends of the tension and compression members integral with each other.

The invention is hereinafter more fully described and claimed.

Figure 2:
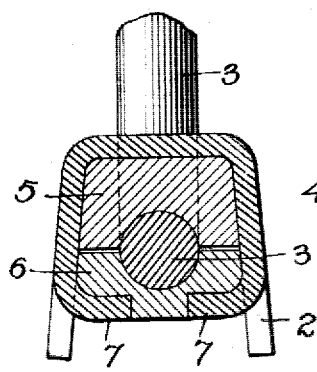
Figure 1:
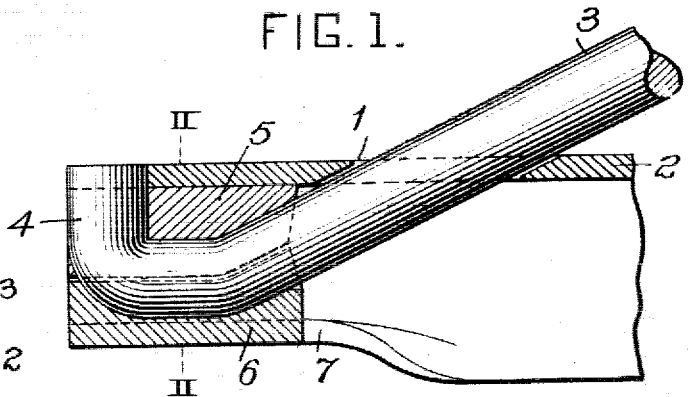
Figure 3:
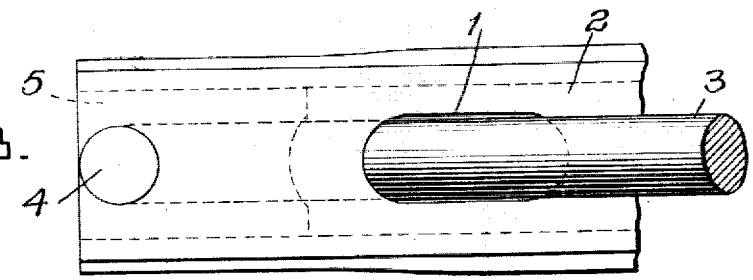
Figure 5:
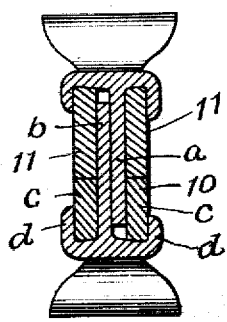
Figure 4:
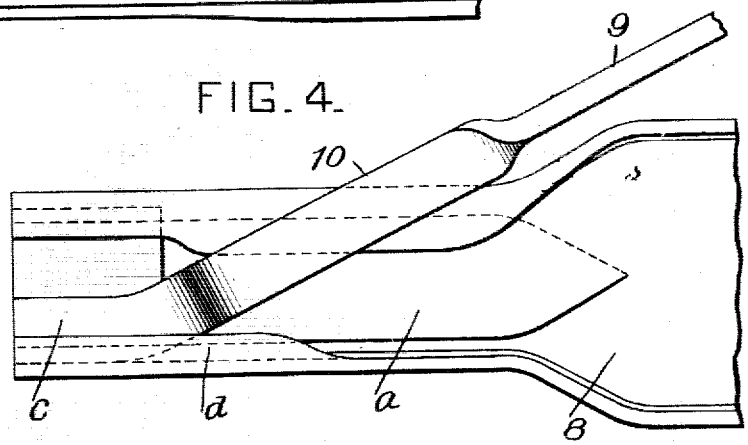
Figure 6:
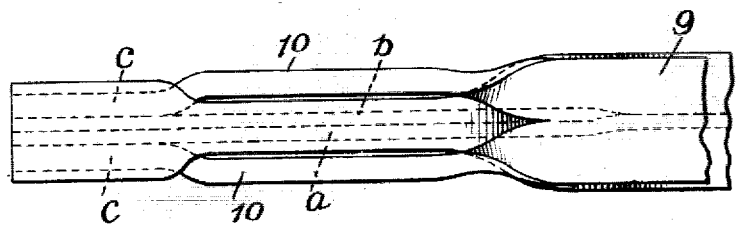
Figure 7:
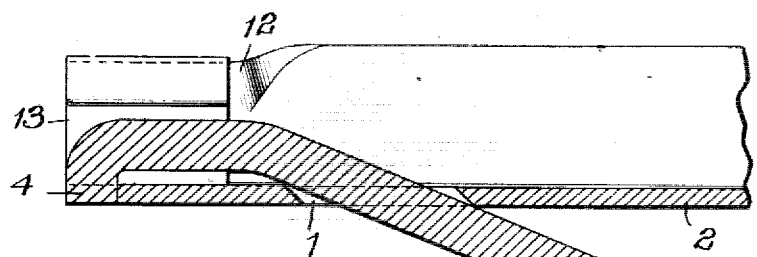
Figure 9:
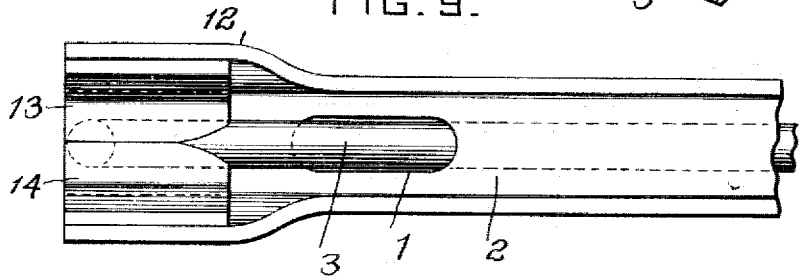
Figure 8:
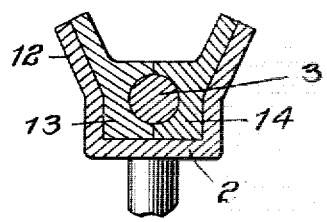
Figure 10:
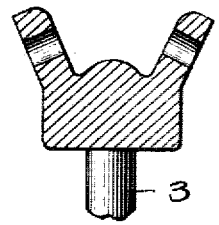

In the accompanying drawings forming a part of this specification, Figure 1 is a view of the end portion of a brake beam having its compression member formed of a channel bar and illustrating the manner of securing the tension member to the compression member; Fig. 2 is a sectional view on a plane indicated by the line II—II Fig. 1; Fig. 3 is a plan view of the construction shown in Figs. 1 and 2. Figs. 4, 5 and 6 are views similar to Figs. 1, 2 and 3 showing the manner of securing the tension member to the compression member when the latter is formed of an I-beam; Figs. 7, 8 and 9 are views similar to Figs. 1, 2 and 3, illustrating another manner of securing the tension to the compression member when the latter is formed on a channel bar; Fig. 10 is a sectional view of a completed beam through the brake head seat; Fig. 11 is a sectional view of an end of a brake beam embodying my improvement and constructed so as to provide for an automatic adjustment of the brake beam head and shoe; Fig. 12 is a plan view of the construction shown in Fig. 11; Fig. 13 is a transverse section through the head, and its seat on the beam showing means for locking the head on its seat; Fig. 14 is a view similar to Fig. 11 showing a key for holding the head locked in position in case of breakage of the spring; Fig. 14ᵃ is a sectional view illustrating a modification of the construction shown in Fig. 14. Fig. 15 is a view similar to Fig. 13 illustrating a modified construction; Fig. 16 illustrates one-half of a complete brake beam embodying my improvement; Fig. 17 is a side elevation of the same; Fig. 18 and Fig. 19 are detail views on an enlarged scale illustrating the manner of constructing the strut member and securing the same in position.

In the manufacture of brake beams having the compression member formed on the channel bar, an opening 1 is formed in the web 2 of the channel a suitable distance from the end thereof, through which is passed the end of the tension member 3. This member is provided at its end with an upturned portion 4 which preferably projects into the notch or opening in the web of the compression member at or adjacent to the extreme end thereof as clearly shown in Figs. 1 and 3. Filling blocks 5 and 6 are arranged within the channel bar or compression member completely surrounding the portion of the tension member within the channel, and the edges 7 of the channel are then bent over, securing the blocks in position. The end of the beam with the parts in the position described, is then raised to a welding heat and the parts are welded together, thus making the end of the tension member integral with the compression member without any material reduction in the cross sectional area of the compression member, and also forming a solid seat for the brake beam head.

When the compression member is formed of an I-beam as shown in Figs. 4, 5 and 6, the web 8 of the latter is split for a suitable distance from its end and the two portions are moved laterally out of line and then forced towards each other so that the web *a* of one portion will slide by and overlap the web *b* of the other portion as clearly shown in Fig. 4. The compression member 9 which is preferably formed of a flat bar in such case, is also split for a portion of its length and the split portions 10 twisted through an arc of 90° as clearly shown in Figs. 4 and 6. The legs thus formed are arranged to straddle the upper portion of the ends of the compression member, the flanges thereof being curled down against the web as indicated at *c*. The ends of the legs of the tension member extend to or approximately to the end of the compression member and are held laterally in place by bending over the portions *d* of the web of the I-beam as shown in Fig. 5. Filling blocks 11 are arranged on each side of the overlapping webs, *a* and *b*, of the compression member and between the ends of the legs of the tension member and the outer flange of the compression member. With the parts arranged in this manner the ends of the beam are raised to the welding temperature and the parts are completely welded together.

In Figs. 7, 8 and 9 is shown another manner of connecting the compression and tension members, such manner being especially applicable for use where the beam is provided with outwardly flaring side portions for the purpose of attaching the brake beam head thereto as clearly described and claimed in an application Ser. No. 326,435, filed July 16, 1906. In this connection the sides of the channel adjacent to the end are given an outward flare or inclination as shown at 12. The filling blocks 13 and 14 are arranged so as to inclose the portion of the tension member within the channel, and also have flaring portions which will lie along the flaring portions 10 of the channel. When heated and welded together the end of the beam will have the shape shown in Fig. 10.

While any suitable form or construction of strut member may be employed in connection with my improved beam, the form shown in Figs. 16 to 19 inclusive is preferred. This form consists of a head portion 15 integral with the legs or supporting members 16 and provided with a seat for the compression member. When forming this strut member the head is first shaped with the legs parallel with each other and with the axis of the seat in the head for the tension member. The legs are then twisted so as to throw the sides of the legs between which the brake lever is arranged, at the desired angle.
This twisting will throw the lower portions or feet 17 of the strut out on each side of a compression member and in order to bring them back into position on the compression member, an edgewise bend is made as indicated at e, thereby bringing the feet 17 into proper position on the compression member to which they are secured in any suitable manner as by bolts or rivets. It is preferred in order to hold the legs in proper relative position that a spacing block 18 should be arranged between the legs as shown, said block being held in position by a bolt or rivet. As shown in Figs. 17 and 18 an ear bolt 25 to which the beam supporting chain may be attached is passed through the strut and secured in position by riveting, or in any suitable manner.

In order to prevent an unequal wear of the brake-shoe due to its changes of position relative to the wheel when the car is loaded or unloaded, it is preferred that the brake beam head should be adjustably mounted on the beam. To this end the end of my improved beam is rounded on one side, as shown in Figs. 11 and 13, thus forming a seat 18ª for the head 19 which is provided with eyes or sockets 20 for the reception of the end of the beam. This seat portion of the beam is not a complete cylinder as will be seen by reference to Fig. 13, and in order to lock the head on the beam I provide a locking block 21 fitting within the socket and having lugs or shoulders 22 engaging the outside walls of the socket. This locking piece 21 may be secured to or formed integral with a spring 23 firmly secured to the compression member as shown in Figs. 11, 12 and 14.
When it is desired to place a head on the beam, the locking block is forced toward the seat, the head slipped into position and the spring released. The locking block will then draw the head firmly to its seat and will hold the same as against movement along the beam.
While permitting the automatic shifting of the head the spring lock will hold the same firmly not only as against displacement along its seat but also as against rattling or other undesired movement. This manner of securing the head on the beam avoids the use of rivets and bolts and permits the head being easily and quickly removed even when the brake beam is of the inside hung type.

In order to prevent the head from moving around on its seat, thereby causing one or the other end from rubbing on the wheel, the head is provided with V-shaped teeth engaging with similar teeth on its seat. This construction will permit the head being automatically shifted when the brakes are applied, but will prevent rotary movement at other times.

In order to prevent the head from becoming unlocked in case of the breaking of the spring, a key 24 may be inserted between the locking block and the end of the beam, said key being held in position by a bolt or other suitable means. In Fig. 14ª the slipping of the head off of the beam in case of a breaking of a spring 23, is prevented by a stop 24ª consisting of a bolt screwing into the beam.

As shown in Fig. 15 my improved means for locking the head in position may be applied to construction in which an automatic adjustment of the head is not desired. As shown the seat on the head and the socket in the head may be made angular in cross section and the head locked in any other suitable manner.

I claim herein as my invention:

1. A brake beam having in combination a structurally shaped compression member, a tension member having its ends welded to the compression member, the end portions of the compression member being filled out solid to dimensions not materially smaller than the body of the member.
2. A brake beam having in combination a structurally shaped compression member, a tension member having its ends lying within the flanges of the compression member and welded thereto, the ends of the compression member being filled out solid.
3. A brake beam provided with seats at its ends, in combination with heads provided with sockets fitting on said journals, and a spring lock for holding the head in position on the seats.
4. A brake beam provided with semi-cylindrical journals, in combination with a head provided with circular sockets fitting over the journals, a locking block having a face or seat for the socket and provided with a shoulder engaging the socket and a spring connecting the locking block to the beam.
5. A brake beam provided with journals at its ends, in combination with heads provided with circular sockets mounted on the journals, a spring lock for holding the head in position on the journals, the journals and inner wall of the sockets being provided with interlocking projections.
6. A brake beam provided with journals at its ends, said journals having a radially yielding portion, in combination with heads provided with circular sockets mounted on the journals, the journals and inner walls of the sockets being provided with interlocking projections.
7. A brake beam provided with a divided or sectional head seat, one of said sections being provided with retaining lugs or shoulders in combination with a head provided with a socket portion fitting around the seat, and means for forcing the sections apart.
8. A brake beam having in combination therewith a strut consisting of a head portion provided with a seat for the tension member, twisted legs integral at one end with the head and provided with feet adapted to be secured to the compression member.

In testimony whereof, I have hereunto set my hand.

JAMES H. BAKER.

Witnesses:
CHARLES BARNETT,
J. HERBERT BRADLEY.